United States Patent Office.

CARL ADOLPH SAHLSTRÖM, OF JÖNKÖPING, SWEDEN, ASSIGNOR TO THE NORMAL COMPANY, (LIMITED,) OF WESTMINSTER, ENGLAND.

PROCESS OF OBTAINING GLUE FROM MARINE ANIMALS.

SPECIFICATION forming part of Letters Patent No. 353,824, dated December 7, 1886.

Application filed November 1, 1886. Serial No. 217,722. (No specimens.) Patented in England December 5, 1882, No. 5,786; in Belgium May 21, 1886, No. 73,210, and in Italy September 30, 1886, No. 20,021.

*To all whom it may concern:*

Be it known that I, CARL ADOLPH SAHLSTRÖM, a subject of the King of Sweden, residing at Jönköping, in the Kingdom of Sweden, engineer, have invented certain new and useful Improvements in the Treatment of the Flesh or Material of Fish, Whales, and other Sea Animals, to Obtain Useful Products Therefrom, (for which Letters Patent in Great Britain, No. 5,786, dated the 5th day of December, 1882, have been granted to Lorentz Albert Groth, of 30 Finsbury Pavement, London, England, as a communication to him from me, and for which Letters Patent in Belgium, No. 73,210, dated May 21, 1886, and in Italy, No. 20,021, dated September 30, 1886, were granted to the Normal Company, (Limited,) of 52 Parliament Street, in the city of Westminster, England, as my assignees;) and I do hereby declare that the following is a full, clear, and exact description of the invention, which will enable others skilled in the art to which it appertains to make and use the same.

The object of this invention is the utilization of the shark, whale, seal, and other sea animals, and some kinds of fish, and the offal arising from the curing and drying of cod and other fish, and the production of glue therefrom after the separation of other products.

For these purposes the raw material is cut up into as small pieces as possible by mechanical means, and is placed in a vat provided with stirring apparatus. A quantity of clean water free from lime is boiled and cooled down to from 6° to 15° centigrade, and to this is added so much dissolved hypermanganic alkali as will impart to the water a light red color (say from one to ten grams for every one hundred liters of water) and from twenty to one hundred grams of ammonia. Sufficient of this liquor is added to the finely-cut raw material to give thereto the consistence of thin gruel, and the stirring apparatus is then set to work. After a period of from ten to thirty minutes the mass is removed from the vat and is placed in a centrifugal apparatus for the purpose of separating the liquor which carries the fat with it. The inner part of the centrifugal apparatus is preferably covered with cloth. When all the fluid is separated, the mass is again soaked in fresh liquor and passed through the centrifugal apparatus, and this is done as often as may be found necessary to remove all the fat. All the fluid obtained is mixed together and left to stand in a deep tank for a period varying according to the temperature and until complete separation takes place. The fat and oil rise to the top of the liquid and is removed for further treatment. The fluid thus obtained, free from any particle of fat, is employed for the production of a meat extract. The mass removed from the centrifugal machine is kept for several hours in hot water, the temperature of which should not exceed 80° centigrade. For every one hundred parts of the above-mentioned disintegrated mass from one hundred and fifty to five hundred parts of water are required, with which is also mixed ten parts (more or less) of acetic acid. The fluid portion of this mixture is afterward separated by any suitable means, and is then filtered and evaporated *in vacuo* or open pans until the desired degree of consistence is attained, and is then finally mixed with from one-half to five per cent. of sugar. The product is a fluid glue possessing great tenacity and adhesive qualities.

The mass remaining after the above-mentioned separation of the fluid portion is boiled under a pressure of from three to six atmospheres, and from it is obtained a second-quality glue which is treated in the same manner as above stated.

Glue prepared in the manner above described is free from all noxious salts, and therefore possesses unusual adhering power.

Having now particularly described and ascertained the nature of my said invention, and in what manner the same is to be performed, I declare that what I claim is—

Producing glue from the flesh of fish, whales, seals, and other sea animals by washing out with cold water all albuminous, fatty, and extractive matters and salts, then treating the residue with warm water mixed with acetic acid, and concentrating the fluid product by evaporation, substantially as hereinbefore described.

CARL ADOLPH SAHLSTRÖM.

Witnesses:
WILL MITCHELL, Jr.,
   1 *Adelphi, Aberdeen, Writer.*
G. MAIR HOOD,
   1 *Adelphi, Aberdeen, Solicitor.*